Oct. 20, 1925.
J. F. PETERS
TEAR-OPEN CAN
Filed June 12, 1922
1,557,610
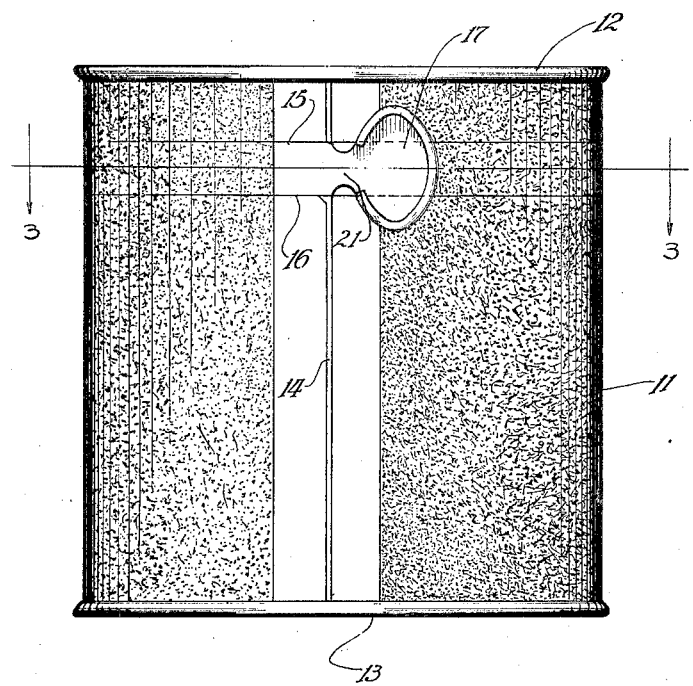
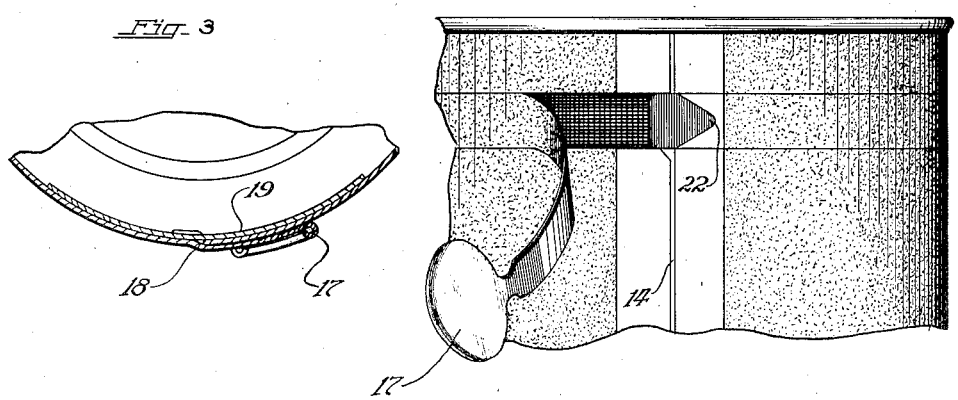
INVENTOR.
John F. Peters
BY Munday, Clarke &
Carpenter
ATTORNEY Patented Oct. 20, 1925.

1,557,610

UNITED STATES PATENT OFFICE.

JOHN F. PETERS, OF ROCHESTER, NEW YORK, ASSIGNOR TO AMERICAN CAN COMPANY, OF NEW YORK, N. Y., A CORPORATION OF NEW JERSEY.

TEAR-OPEN CAN.

Application filed June 12, 1922. Serial No. 567,513.

*To all whom it may concern:*

Be it known that I, JOHN F. PETERS, a citizen of the United States, residing in Rochester, in the county of Monroe and State of New York, have invented a new and useful Improvement in Tear-Open Cans, of which the following is a specification.

My present invention has general reference to containers of the tearing strip variety and particularly to those in which the body is joined in a side seam adapter to have solder applied thereto by an external roll. With a container of this character, difficulty has been experienced in having the tearing strip tongue, which extends from the body at the side seam, bound down by the solder, which is necessarily applied to the surface adjacent the seam.

It is a principal object of this invention to provide means for facilitating the lifting of the tongue when the solder is so applied by bringing the solder beneath the tongue to a point from which tearing, or lifting may be easily started.
A further object of the invention is the provision of means for accomplishing this purpose without requiring additional expense or difficult operations in the process of manufacture.
Other objects and advantages of the invention will be apparent as it is better understood from the following description, which, taken in connection with the accompanying drawings, discloses a preferred embodiment thereof.

Referring to the drawings,

Figure 1 is a side elevation of a container in which my invention is embodied;

Fig. 2 is a partial detail view thereof, showing the tearing strip tongue lifted and the strip partially torn away; and Fig. 3 is a partial horizontal section taken substantially on the line 3—3 in Fig. 1.

The container shown upon the drawings, for purposes of illustration, comprises, in the present instance, a lithographed body 11, having a top 12 and a bottom 13 hermetically secured thereto and having its body edges joined in a side seam 14. Beneath the top 12 there are provided parallel score lines 15 and 16, setting off a tearing strip which terminates in a tongue, or finger-hold 17.

In accordance with preferred methods of manufacture, the seam 14 has solder applied externally thereto after its formation and this solder necessarily is spread somewhat upon the surface adjacent said seam. Since solder will not adhere to a lithographed surface, a limited area on each side of the seam is left without lithographing and at the point from which the tearing strip tongue extends, the seam is merely lapped, as indicated at 18, in order that the tearing action may be readily started in removing the tearing strip. An interior collar, 19, is provided beneath the tearing strip, as indicated in Figure 3. The solder applied to the side seam necessarily adheres beneath the tearing strip tongue adjacent said seam and when the tongue is of usual form, it is at times extremely difficult to lift it to begin tearing operation.

To obviate this difficulty, I provide a reduced portion 21 intermediate the seam and the hand-hold 17, and preferably rather close to the seam 14. This directs the solder beneath the tongue to a point as indicated at 22 in Figure 2 and, beginning at this point, it is easy to tear away such solder as may be present and, in this manner, binding of the tongue 17 is minimized and the operation of opening the container greatly facilitated.

It is thought that the invention and many of its attendant advantages will be understood from the foregoing description and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. A container, comprising a body provided with a soldered side seam, a tearing strip set off by parallel score lines extending circumferentially about said body and a tongue extending from said tearing strip at and across said side seam, said tongue having its narrowest portion nearest the soldered side seam whereby the soldered connection of said tongue is reduced to a point to permit ready removal of the tearing strip.

2. A container, comprising a body provided with a soldered side seam, a tearing strip set off by parallel score lines extending circumferentially about said body and a tongue extending from said tearing strip at and across said side seam and terminating in an integral finger hold, said tongue having its narrowest portion nearest the soldered side seam whereby the soldered connection of said tongue is reduced to a point to permit ready removal of the tearing strip.

3. A container comprising a body provided with a soldered side seam, and a tearing strip forming a part of said body and set off by parallel score lines extending circumferentially about said body, the end of said strip extending outside of and past said seam and having at said seam a narrow portion, and beyond said seam being expanded and having its edge curled over to form a finger hold for tearing away the strip, said narrow portion of the strip being soldered to the outside of the body of the can.

JOHN F. PETERS.